MULTIBEAM ANTENNA SYSTEM

Filed Oct. 17, 1966 8 Sheets-Sheet 1

INVENTORS
S. V. DRABOWITCH
M. MORLON
Karl F. Ross
Attorney

INVENTORS
S. V. DRABOWITCH
M. MORLON
Karl G. Ross
Attorney

MULTIBEAM ANTENNA SYSTEM

Filed Oct. 17, 1966

8 Sheets-Sheet 3

INVENTORS
S. V. DRABOWITCH
M. MORLON

Karl F. Ross
Attorney

INVENTORS
S. V. DRABOWITCH
M. MORLON
Karl F. Ross
Attorney

INVENTORS
S. V. DRABOWITCH
M. MORLON

Karl F. Ross

Attorney

INVENTORS
S. V. DRABOWITCH
M. MORLON
Karl G. Ross
Attorney

INVENTORS
S.V. DRABOWITCH
M. MORLON
Karl F. Ross
Attorney

INVENTORS
S. V. DRABOWITCH
M. MORLON
Karl F. Ross
Attorney

United States Patent Office 3,380,052

Patented Apr. 23, 1968

3,380,052

MULTIBEAM ANTENNA SYSTEM

Serge V. Drabowitch, Chatenay-Malabry, and Michel Morion, Massy, France, assignors to Compagnie Francaise Thomson Houston-Hotchkiss Brandt, Paris, France, a corporation of France Filed Oct. 17, 1966, Ser. No. 587,067
Claims priority, application France, Oct. 15, 1965, 35,191
19 Claims. (Cl. 343—16)

ABSTRACT OF THE DISCLOSURE

This invention teaches a new principle for the construction of multibeam antenna systems more especially in regard to the antenna arrays constituting the primary radiating sources in such systems.

The invention resolves the conflict that has heretofore existed between the two aims of (1) maximizing the gain of the antenna system and (2) maximizing the resolving power, and thereby makes it feasible to construct multibeam antenna systems, as well as radar installations embodying them, having greatly enhanced performance as compared to the prior art.

Basically, these results are obtained by so constructing and operating the primary antenna array in a multibeam system that the over-all energy distribution pattern at the radiant surface of the array takes the form of a pair of separate, continuous sinusoidal curves symmetrically internested with each other in orthogonal relation, the two curves being mutually displaced substantially by the transverse extent of the radiant aperture of one individual radiator of the array and each undulation of each curve extending substantially over a transverse extent corresponding to both radiant apertures of two adjacent radiators in the array; each undulation of each curve substantially coincides with the diffraction pattern produced from a point source at infinity through the focalizing device associated with the array.

*Background of the invention*

Multibeam antenna systems are widely used in present-day radar systems of the so-called three-dimensional type, for simultaneously generating a plurality of beams of radar energy spread over a scanning plane, or two coordinate scanning planes, whereby the simultaneous monitoring of many targets distributed over wide areas of space can be performed.

Such a multibeam antenna system consists broadly of two parts, i.e., a primary radiating source in the form of an array of horn antennas or equivalent radiator units, and a focalizing device such as a parabolic mirror or lens, disposed in mutually irradiating relation with the primary source. This basic arrangement is diagrammatically illustrated in FIG. 1 of the accompanying drawing, where reference 1*a* designates the focalizing device just referred to, here shown as a lens, and 2*a* generally designates an array of horn radiators constituting the primary source. It will be noted that the radiant apertures of all the radiators of the array are disposed along a part-spherical (or part-cylindrical) surface S*a* which constitutes the focal surface of the focalizing device 1*a*, with the axes of all the radiators converging towards the center of the focalizing device.

In the operation of such an arrangement during transmission, UHF electromagnetic wave energy is applied to the radiators 21*a*, 22*a*, etc. by way of the feeder guides 31*a*, 32*a*, etc. from a suitable transmission source not shown. This energy is radiated by the radiators towards the lens 1, the curve PD indicating a typical primary radiation diagram obtainable with a horn radiator array of the prior art. The lens 1 in turn refracts the energy as a plurality of separate beams, indicated by the lobes SD1, SD2, SD3, etc. forming part of the secondary radiation diagram which constitutes the over-all radiation diagram of the antenna system.

In reception, by the well-known reversibility principle of electromagnetic wave propagation, the operation is generally the same in reverse. That is, energy beamed from one or more targets situated in the general area of the beams is received by lens 1 in accordance with the lobes of the secondary radiation (or directivity) diagrams SD1, SD2, etc. The energy is then concentrated by lens 1*a* in the focal surface S*a* which coincides with the surface on which the radiant apertures of the primary radiators are disposed. Here again, the radiation (or directivity) diagram of the primary radiators is given by the curve PD. Finally, the energy is transferred by way of the feeder lines 31*a*, 32*a*, etc. to receiver apparatus not shown.

It should be indicated in this connection that, according to the standard terminology used in antenna engineering, the verb "radiate" and its derivatives serve to describe both the conversion of EM energy from the channelized form in which it travels through the feeders such as 31*a*, 32*a* into space waves propagating away from the antenna or radiator, and the reverse conversion of energy from the form of space waves, propagating towards the antenna or radiator, into channelized energy traveling through the feeders. Similarly, the word "feed" and derivatives serve to describe the transfer of channelized energy through the feeder lines or waveguides whether the energy is traveling towards or away from the radiator to which said lines are connected. These definitions are to be borne in mind upon a reading of this specification and the appended claims.

An endeavor to increase the performance of a multilobe antenna system of the kind to which the invention relates must seek to maximize two chief characteristics of the system, namely (1) gain and (2) resolution. The gain, which as a crude but convenient representation can be considered as proportional to the length of the main lobe of primary radiation diagram PD or of secondary radiation diagram SD1 etc., must be increased to increase the range of the antenna system, an important consideration in present-day radar work. The resolution, which conveniently can be assimilated with the angular separation between two beams or lobes such as SD1, SD2, SD3, is equally important in order to enable the system to discriminate between nearby targets. It will thus be apparent that the two characteristics, gain and resolution, are separate and distinct from each other. More than that, however, it has generally been believed in the past that the two charactetristics were negatively correlated, or conflicting; that is, it was believed that an increase in gain, beyond a certain point, necessarily brought with it a decrease in resolution, and vice versa.

The reason for this conflicting relationship between gain and resolution can be readily understood from the following considerations. It is apparent that in order to increase the gain, it is necessary to increase the transverse aperture of each radiator of the array since this will increase the amount of incident energy collected from a target. On the other hand, it is equally apparent that in order to increase the resolution or separating power of the system, the transverse dimension of the radiant aperture should be reduced so as to enable a greater number of narrow radiators to be placed side by side in the array, with the main directional lobe or beam from each radiator collecting energy from only a single target. The conflict is thus evident.

More precisely, it can be demonstrated that the gain is maximized if the transverse dimension of the radiator aperture is made equal to the diameter of the central lobe of the diffraction pattern produced by an infinitely remote or point source through the focalizing device associated with the radiator: an increase in radiator dimension beyond that value will not bring with it any further increase in gain. The dimension of the radiant aperture for which the gain is a maximum is $2\lambda F/D$, where $\lambda$ is the wavelength, F the focal length of the focalizing device used, and D the aperture of said device.

It can also be demonstrated that the resolving power is maximized if the transverse dimension of the radiator aperture is made equal to the valve $\lambda F/D$, since the resolving power of the system then equals the resolving power of the focalizing device, so that a further decrease in radiator dimension will not bring with it any increase in resolution.

It therefore seems evident that the dimensioning of the radiators can be predetermined to achieve maximum gain, or maximum resolution, but cannot be determined so that both these factors would be maximized at the same time. In line with this, the primary radiator arrays in conventional multibeam antenna systems have usually been dimensioned so as to strike a compromise between the two conflicting desiderata, and the performance characteristics of such systems have been seriously limited accordingly. In some instances, the primary array was constructed to afford maximum resolution, but only at the cost of high losses which impaired the gain and hence the range of the system.

The invention, in an unexpected yet simple and straightforward manner, completely avoids the conflict, heretofore believed inevitable, between the gain and the resolving power of the primary radiator array in a multibeam antenna system, and thereby greatly enhances the performance of these systems.

To complete the exposition of the background of the present invention, it is indicated that two broad concepts, disclosed in earlier patent applications and publications of one of us have played an important part in the birth and development of this invention. The first concept may be termed the application of signal theory to antennas, and the second is the concept of multimode radiator structures.

The principle of application of signal theory to antennas has been disclosed in "Application de la Théorie du Signal aux Antënnes" by S. Drabowitch, Société Francaise des Radio-Electriciens, Paris, Jan. 20, 1965. Briefly summarized, this principle recognizes that the same mathematical formalism is able to describe the behavior of signals both in a signal-transfer system, with reference to the variable time, and in an antenna system, with reference to a space coordinate. Because of this fundamental equivalence, an antenna system can be regarded as a kind of filter. Just as an ordinary filter of EM waves will respond to an input signal in the form of a short impulse by producing an output signal of non-negligible duration and generally of oscillatory character, whose characteristics are determined not by the input pulse signal but by the filter components, so does an antenna system, when irradiated with an input signal from an infinitely remote (or point) source, respond by creating a focal image of substantial spatial extent, the so-called diffraction pattern of the antenna, which is undulating in shape with geometric characteristics that depend on the structure of the antenna, not on that of the point source producing the image. The principle of application of signal theory to antennas is of great value in that it places at the disposal of antenna engineers the vast fund of knowledge that has been accumulated over the past 20 or 30 years in regard to information-transfer systems.

The second principle, that of multimode radiator structures, has been disclosed in S. Drabowitch's commonly assigned co-pending patent application No. 315,949, filed Oct. 14, 1963, now Patent No. 3,308,469. In brief, a multimode radiator is adapted for selectively controlling the electric-field-distribution pattern at the radiant aperture of the antenna, and hence the directional or radiation diagram thereof. This is done by superimposing a plurality of exciting EM waves of predetermined phase and amplitude characteristics applied to respective parallel inputs of the antenna, and by dimensioning the antenna so that it will sustain the propagation of certain selected energy modes, which will combine at the radiant aperture to generate the prescribed field pattern.

The concepts briefly outlined above will become clearer as the present disclosure proceeds.

*Description of the invention*

The invention will now be described in detail with reference to the accompanying drawing wherein.

Figure 2:
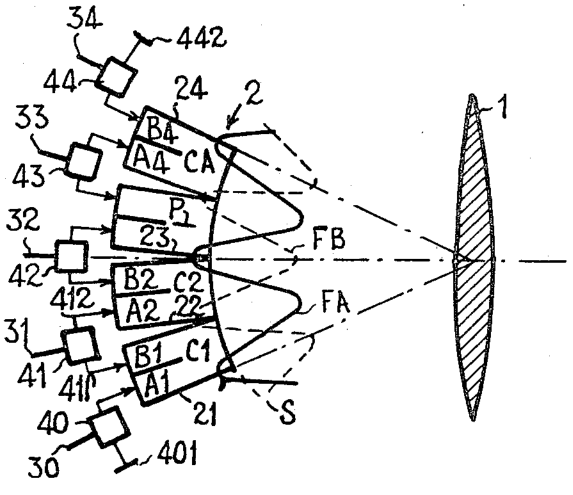
FIG. 2 is a schematic view of an antenna system according to the invention including a showing of the primary field-distribution patterns associated with the primary array thereof.
Figure 3:
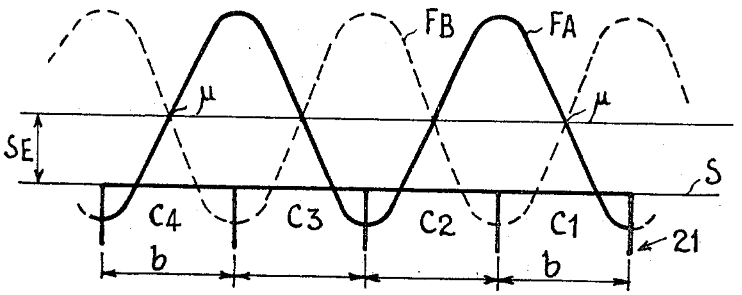
FIG. 3 illustrates the primary field-distribution patterns of FIG. 2 with greater clarity.
Figure 4:
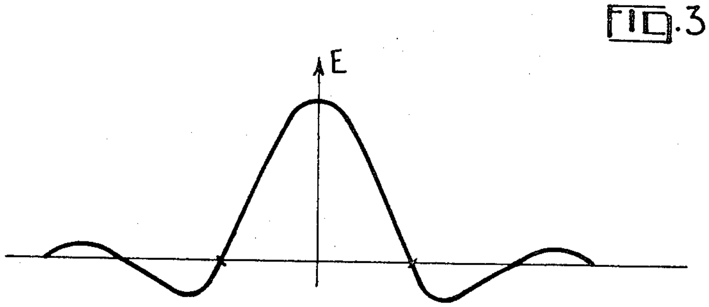
Figure 5:
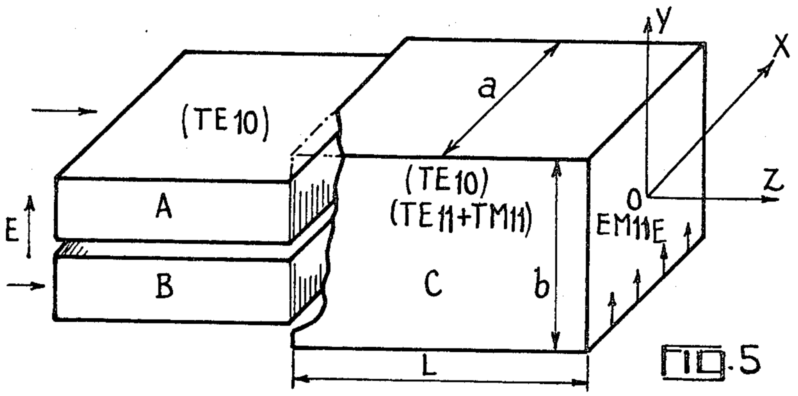
Figure 6A:
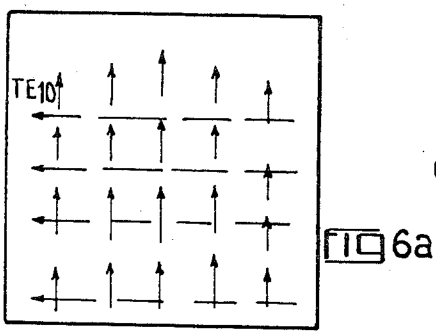
Figure 6B:
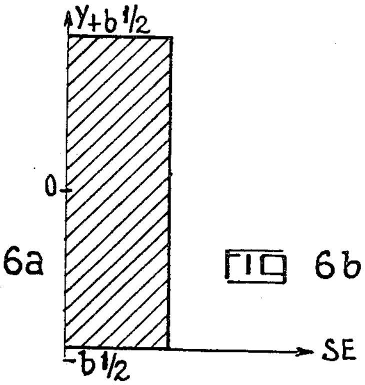
Figures 7A, 7B, 7C, 7D:
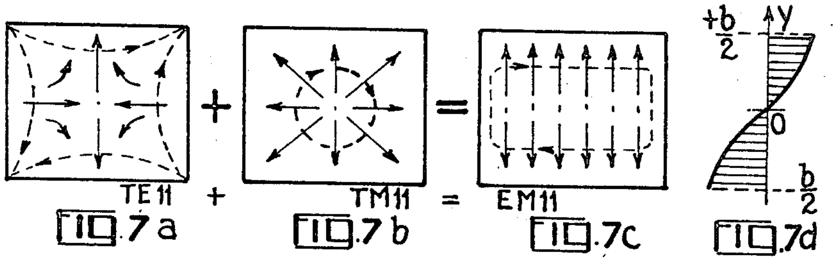
Figures 8A, 8B, 8C:
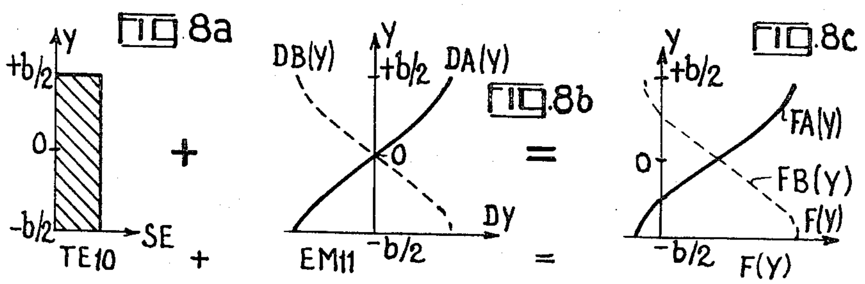
Figure 9:
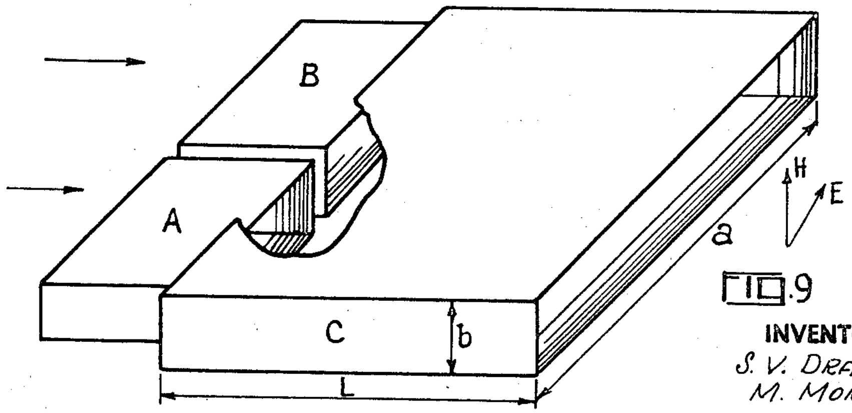
Figure 10A:
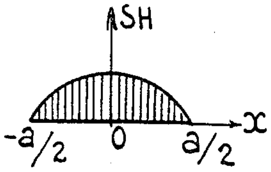
Figure 10B:
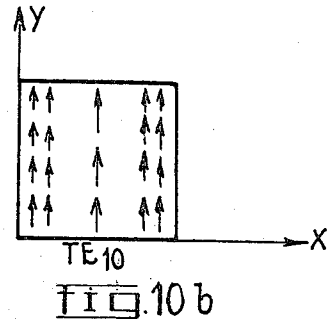
Figure 11B:
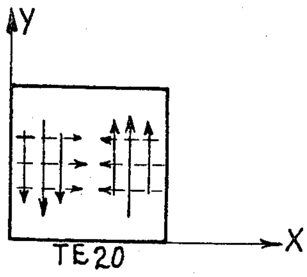
Figure 11A:
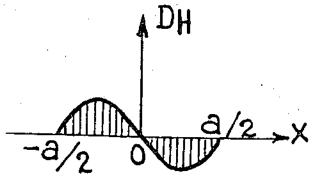
Figure 12:
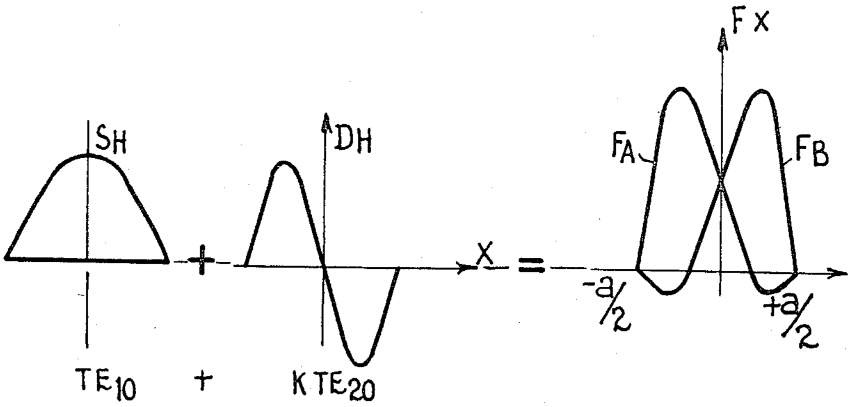
Figure 13:
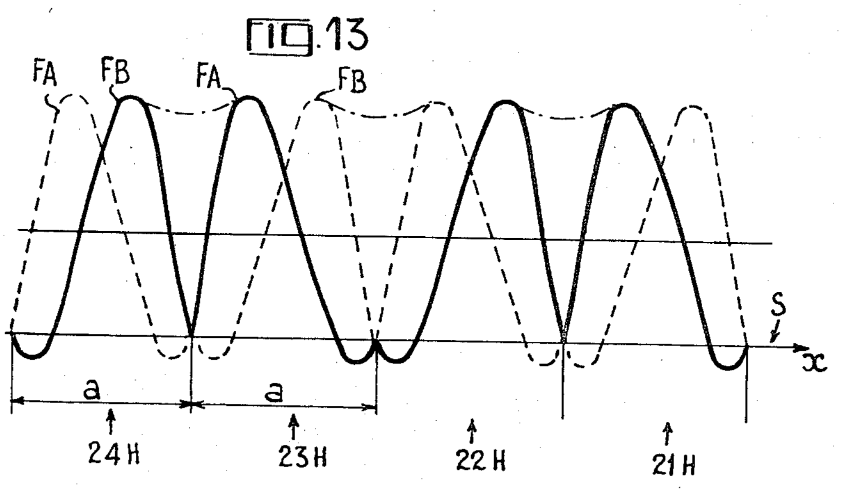
Figure 14:
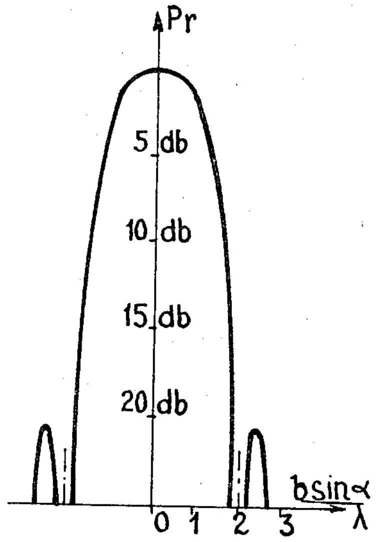
Figure 15:
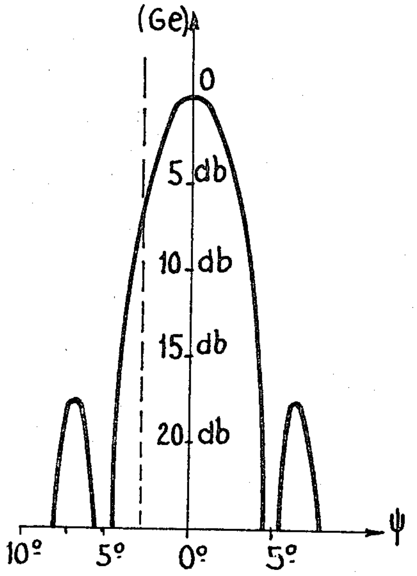
Figure 16:
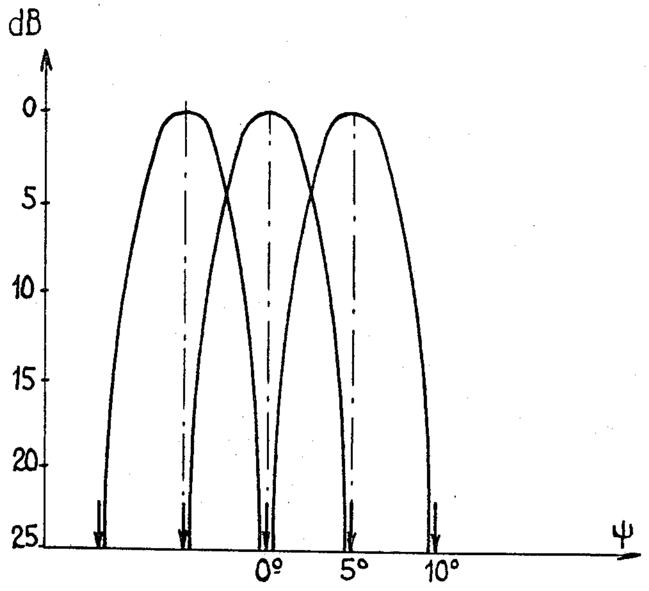
Figure 17:
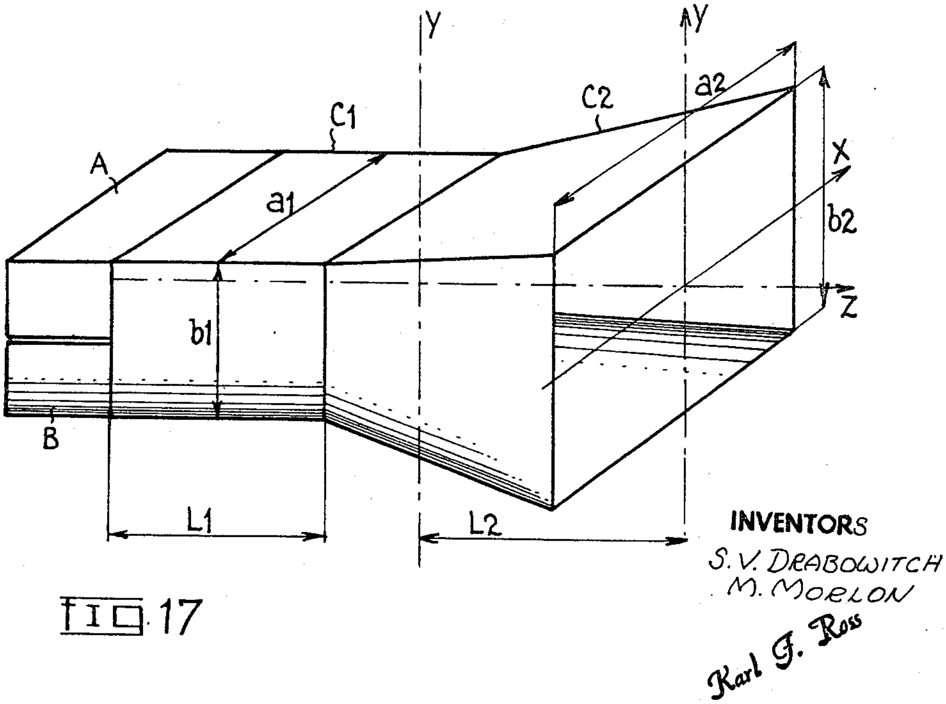
Figure 18:
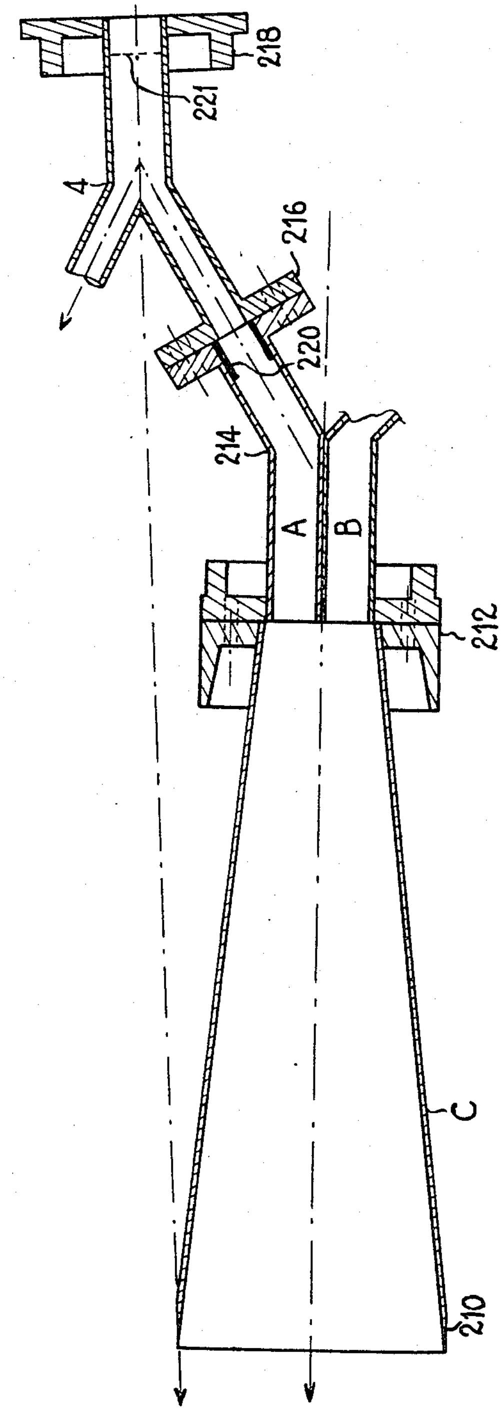
Figure 19:
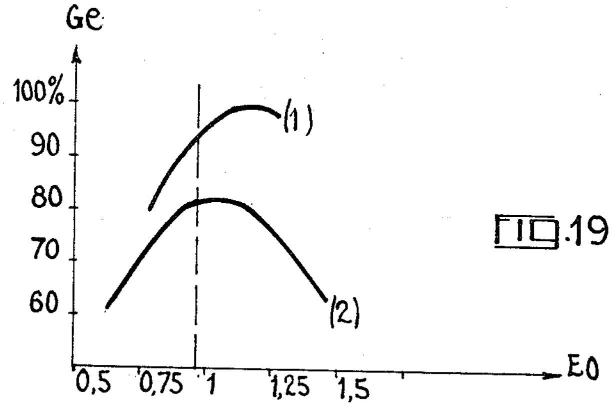
Figure 20:
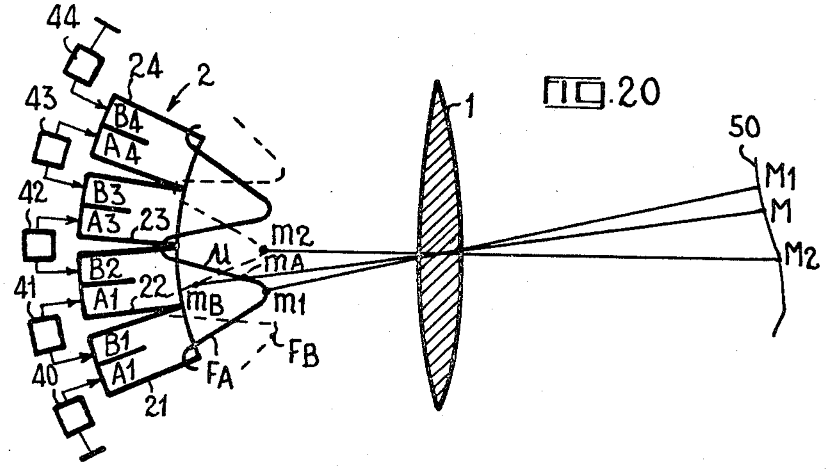
Figure 21:
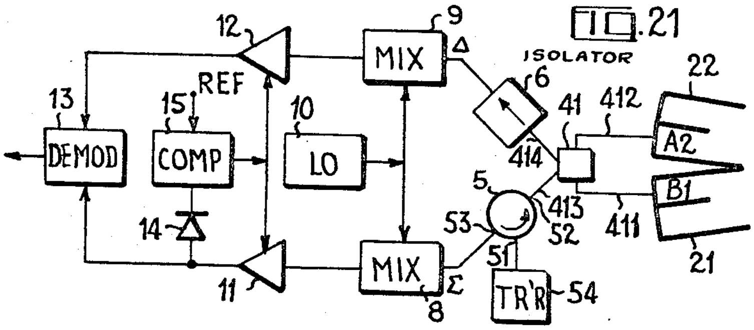

FIG. 4 indicates the field-distribution curve of a diffraction pattern produced by a point source through the focalizing device;

FIG. 5 is a simplified perspective view of one form of multimode radiator source according to an earlier patent of one of the present patentees, and usable in an array according to this invention;

FIGS. 6*a* and 6*b* show field-distribution patterns associated with the multimode radiator of FIG. 5, in one hypothetical type of operation;

FIGS. 7*a*, 7*b*, 7*c* and 7*d* schematically illustrate how the vector addition of two energy modes propagating through the multimode radiator of FIG. 5 in another hypothetical type of operation produces another and different field distribution pattern;

FIGS. 8*a*, 8*b* and 8*c* similarly show how the field-distribution patterns produced in both hypothetical types of operation just referred to are vectorially added to produce a field-distribution pattern which is that presently in actual operation;

FIG. 9 is a view analogous to FIG. 5 but shows another form of multimode radiator;

FIGS. 10*a* and 10*b* correspond to FIGS. 6*a* and 6*b* but relate to the radiator of FIG. 9;

FIGS. 11*a* and 11*b* correspond to FIGS. 7*a* and 7*b* but relate to the radiator of FIG. 9;

FIG. 12 corresponds to FIGS. 8*a*–8*c* in the case of the radiator of FIG. 9;

FIG. 13 is analogous to FIG. 3 in the case of the radiator of FIG. 9;

FIGS. 14, 15 and 16 are typical directivity diagrams illustrative of the performance of the antenna system of the invention;

FIG. 17 is a simplified perspective view showing a modification of the multimode radiator shown in FIG. 5;

FIG. 18 is a sectional view of a practical embodiment of a multimode radiator structure usable in a system according to our invention;

FIG. 19 shows typical gain curves in a system of the invention and a comparable conventional system;

FIG. 20 is a view similar to FIG. 2 but illustrating the principle of target interpolation; and FIG. 21 illustrates interpolator circuitry used in a preferred embodiment of the invention.

In the embodiment of the invention shown in FIG. 2, the improved multilobe antenna system comprises a focalizing device 1, shown as a lens, and a primary radiating source in the form of a radiator array generally designated 2, comprising four multimode radiator structures 21, 22, 23 and 24. The multimode radiator structures will be described in detail hereafter and will at this point be outlined only schematically. Each radiator structure, such as unit 21, includes a pair of parallel excitation sections, A1 and B1, followed by and merging with a common main section C1. The transverse width of the main section is here shown as equal to the combined widths of the excitation sections. The main sections C1, C2, C3 and C4 of the four radiator structures of the array have their radiant mouth apertures disposed in adjacent relation upon the focal surface S of the focalizing device 1 so that each mouth aperture coincides with a respective sector of surface S.

The excitation sections or branch waveguides A, B of the multimode radiator structures are connected to be fed with signal energy from the series of output lines 30 to 34 by way of hybrid junctions or couplers 40 to 44, according to the scheme shown. The adjacent excitation sections such as B1 and A2 of respective adjacent radiator structures are connected to the respective output legs 411 and 412 of a common hybrid junction 41, whose input leg is connected to the associated energizing circuit 31. It will be noted that the hybrid junctions 40 and 44 associated with the excitation sections A1 and B4 of the end radiator structures 21 and 24 of the array have their free output legs connected to matched loads 401 and 442.

As explained in Drabowitch's co-pending patent application identified above, the field-distribution pattern in the output plane of each multimode radiator structure, e.g., unit 21, is the vector sum of the partial field distributions due to the wave energies fed from the two excitation sections A1 and B1 of the radiator structure. As will be described in detail presently, the over-all field-distribution function generated at the radiant surface S by all of the "A" excitation sections of the array is represented by the full-line undulating curve $F_A$, and the over-all field distribution function generated by all of the "B" excitation sections is represented by the dashed undulating curve $F_B$. The curves $F_A$ and $F_B$ are more clearly apparent in the view of FIG. 3, in which the focal surface S is flattened out into a plane for clarity.

It will be observed that the two curves $F_A$ and $F_B$ are undulating, essentially sinusoidal curves which are symmetrically interleaved with each other, being mutually displaced by a distance "$b$" equal to the common width of the radiant apertures of the radiator structures. The cycle period of each curve has the length $2b$, twice the width of the radiant aperture of a radiator. Further, the sinusoidal curves are seen to be displaced in the direction of positive field values by the quantity indicated as $S_E$, so that the pattern has large positive lobes and small negative peaks between the positive lobes.

As will be shown in detail later, the field strengths or energies represented by the two curves $F_A(y)$ and $F_B(y)$ can be made to be substantially fully decoupled from each other. This means that the directional diagram of the primary array, which is represented by the Fourier transform of the field-distribution pattern, will possess true radiation lobes corresponding to each of the crests of each of the two curves $F_A$ and $F_B$. Since the spacing between the crests of the respective curves equals the width "$b$" of a radiator aperture, it is apparent that the resolving power of the array will be the same as that of a conventional array using twice as narrow radiant apertures but with the field-distribution loops not interleaved as in the array of the invention.

The field-distribution curve of a diffraction pattern produced by a point source through the focalizing device, at a location corresponding to any one of the radiators of the array, is of the general form shown in FIG. 4, including a large positive central lobe and a symmetrical series of rapidly decreasing negative and positive side lobes. It can be demonstrated (through the teachings of signal theory applied to antennas) that the gain of a radiator is maximum if the field-distribution pattern of the radiator coincides with the diffraction pattern produced at the location of the radiator by a point source. It is immediately apparent from a comparison of FIGS. 3 and 4 that each of the loops of either of the two field-distribution curves $F_A$ and $F_B$ in FIG. 3, including the large positive center lobe and one half of each of the minor negative side lobes, quite closely resembles the corresponding diffraction pattern shown in FIG. 4, with its large positive center lobe and parts of the first-order negative minor side lobes. As will be shown mathematically at a later point, it is possible to fit the field-distribution curves $F_A$ and $F_B$ so that they will substantially coincide with the corresponding diffraction curves. The gain through each of the radiators of the array will then be maximized.

Thus, the seeming incompatibility between maximization of gain and maximization of resolving power, which has limited the performance of conventional multibeam antenna systems as described above, is seen to be totally avoided according to the invention. This unexpected and at first sight paradoxical result is obtained essentially as a consequence of the two overlapping but separate and non-interacting field-distribution curves $F_A$ and $F_B$ which are generated at the radiant surface S of a primary radiator array constructed according to the invention.

The manner in which this two-curve field-distribution pattern is generated will now be disclosed in greater detail.

FIG. 5 is a simplified perspective view of one embodiment of an elementary multimode radiator structure usable in the array 2 of FIG. 2. The multimode structure here shown is of the so-called E-plane type and is suitable for use in a primary array generating a plurality of stacked beams displaced along the direction OY parallel to the E-vector of the energy propagating through the radiator, which propagation direction is designated OZ. The third coordinate OX indicates the direction of the H vector. The E-plane-type multimode structure is seen to include the two parallel excitation sections A and B and the common main section C, as earlier described with reference to FIG. 2. The excitation sections A and B are rectangular waveguide sections of similar dimensions and arranged in stacked relation with their broad sides parallel and spaced in the direction OY. The main section C has a width $a$ which preferably is equal to that of the excitation sections, and a height $b$ which may be equal to or, as here shown, somewhat greater than the combined height of the excitation sections. Main section C, here shown of constant transverse area, has a length L and its radiant aperture (at the right end in the drawing) lies on the surface indicated as S in FIGS. 2 and 3. The sections are so dimensioned transversely that each of the excitation sections A and B can propagate the fundamental mode $TE_{10}$ of the UHF energy applied thereto, whereas the main section C can propagate both said fundamental mode $TE_{10}$ and some of the lower-order harmonic modes including the odd (or skew-symmetrical) modes $TE_{11}$ and $TM_{11}$. Higher modes cannot propagate, or are evanescent.

In operation, the excitation sections A and B are excited independently through means later described, with energy whose phase conditions are not correlated, that is, the exciting energy applied to section A is randomly phased with respect to the energy applied to section B. To determine the character of the output field-distribution pattern when only one of the excitation sections, A or B, is excited, it should be noticed that such a field pattern can be considered as resulting from the vector summation of two other field patterns, e.g. (a) that obtained when both sections A and B are excited with coherent waves of equal amplitude in cophasal relation, and (b) that obtained when both sections are excited with coherent waves of equal amplitude in phase-opposed relation, the amplitudes of each of the two component waves being one-half the desired amplitude of the single-input excitation wave. Therefore, it is necessary to consider in succession the output field patterns obtained in each of the two cases (a) and (b).

(a) When the exciting energy at both sections A and B is of the same phase, then it can easily be shown that for reasons of symmetry only even (or symmetrical) modes can propagate down the main section C. Since the only even (or symmetrical) mode that is allowed to propagate through the structure by the dimensioning of the waveguide sections is the fundamental mode $TE_{10}$, only this latter mode will appear at the radiant aperture. The field-distribution pattern of this fundamental mode is well-known, and is illustrated in FIGS. 6*a* and 6*b*. In FIG. 6*a* the electric field-component vectors are shown as full-line arrows and magnetic vectors are shown as broken-line arrows, according to the usual representation. The electric vector is constant across the aperture, as is clearly apparent from FIG. 6*b* where the abscissae represent amplitudes of the electric field.

(b) When the exciting energy fed to sections A and B is in antiphase relation, then it can similarly be shown that only odd (or skew-symmetric) modes of energy can propagate through the output section C of the multimode structure. This means that only the $TE_{11}$ and $TM_{11}$ modes are able to propagate, and that the resulting field pattern at the radiant aperture is the vector sum of the field patterns due to both these modes. The conditions are then as illustrated in FIGS. 7*a* through 7*d*. FIG. 7*a* represents the field pattern in the plane of the radiant aperture produced by the $TE_{11}$ mode, with the electric force lines being again shown as full-line arrows and magnetic lines as broken arrows. FIG. 7*b* shows the output field distribution produced by the $TM_{11}$ mode, using the same symbolism. In this case, as can readily be shown mathematically, the pattern produced by superposition of the two patterns last considered is of the form shown by FIGS. 7*c* and 7*d* in front and side view. That is, the electric field vectors are directed in opposite senses in the upper and lower halves of the radiant aperture, with the field intensities varying according to a semi-sinecurve, as clearly shown in FIG. 7*d*. It is to be noted that since the component exciting modes $TE_{11}$ and $TM_{11}$ fed to the two inputs of the multimode source have the same cutoff frequency and the same phase velocity, the resulting field configuration illustrated by the patterns of FIGS. 7*c* and 7*d* can be considered as constituting a "pseudo-mode," and this can conveniently be designated as the "$EM_{11}$" pseudo-mode.

If now only a single one of the inputs A and B is excited with energy, then, as earlier noted, the resulting field pattern will be the vector sum of the patterns obtained in cases (a) and (b). This is clearly shown in FIGS. 8*a* through 8*d*. FIG. 8*a* is similar to FIG. 6*b* and shows the constant output field produced in case (a), while FIG. 8*b* is similar to FIG. 7*d* and shows in full lines the semi-sinusoidal output field produced in case (b). As will be immediately apparent, the final field pattern, shown in full lines in FIG. 8*c*, is of the same semi-sinusoidal form as in case (b), but is displaced towards the higher field values by an amount corresponding to the constant field value obtained in case (b).

FIG. 8*c* shows in full lines, at $F_A(y)$, the field pattern produced when a single one of the two inputs, say input A, is excited. With only the other input, B, excited, there is produced a field pattern similar to that shown as $F_A(y)$, but reversed with respect to the midpoint O of the vertical dimension of the output aperture, as shown in broken lines by the curve $F_B(y)$.

To summarize the above results mathematically, it can be said that in case (a) the output field pattern is representable by a flat curve of equation $S(y)=S_E$ (a constant), in the interval $$\left(-\frac{b}{2},+\frac{b}{2}\right)$$

in case (b) the output field pattern is representable by a sine curve of Equation $D(y)=D_O \sin(\pi y/b)$ over that same interval. The output field pattern in the case where only one input is excited is then represented by the equation $$F(y)=S(y)\pm D(y)$$

with the plus sign being used when one input, say A, is excited, and the minus sign when the other input, B, is excited. We then get the following two equations for the curves $F_A(y)$ and $F_B(y)$ representing the output field patterns when input A or input B is, selectively and respectively, excited:

$$F_A(y)=S_E[1+k\sin(\pi y/b)] \quad (1)$$

$$F_B(y)=S_E[1-k\sin(\pi y/b)] \quad (2)$$

where $k=D_O/S_E$. These equations are true over the interval $$\left(-\frac{b}{2},+\frac{b}{2}\right)$$

Consider now two adjacent multimode radiators of the array shown in FIGS. 2 and 3, say the radiators 21 and 22.

When input energy of a suitable frequency is applied to the feeder input 31 of hybrid junctions 41 associated with both radiators, then this energy is passed in cophasal relation to the excitation sections B1 and A2 of the two adjacent radiators 21 and 22. As will be understood from the above explanations, the energy applied to input B1 will produce at the output aperture of multimode-radiator output section C1 a field-distribution pattern $F_B(y)$ as represented by Equation 2 above and as shown by the dotted-line curve $F_B(y)$ in FIG. 2 or 3. The energy applied to input A2 will produce at the output aperture of output section C2 a field distribution pattern $F_A(y)$ as represented by Eq. 1 and as shown by the full-line curve labeled $F_A(y)$. It will therefore be evident that, in the array of FIG. 2, the energy fed into all of the odd-numbered feeder channels 31, 33, etc. will cooperate to produce a continuous sinusoidal curve of energy distribution as indicated in full lines, and similarly the energy fed into all of the even-numbered feeder channels 30, 32, etc. will contribute to the formation of another, and reverse, sinusoidal curve of field distribution as indicated in dotted lines; curve $F_A$ is composed of segments $F_A(y)$, FIG. 8*c*, periodically reversed upon transition from one radiator 21–24 to the next, curve $F_B$ being analogously constituted from segments $F_B(y)$.

Considering the over-all field distribution pattern produced by the array of multimode radiators, as represented by both the full-line and dotted line curves, several important features of that pattern should be noticed.

In the first place, the two field-strength curves, while being interleaved (or uniformly overlapping) so that their peaks are spaced a minimum distance apart, can at the same time be made mutually orthogonal, in the analytic sense of this word, so that there will be no mutual coupling of the respective field energies represented by the two curves. It is recalled that two functions are said to be orthogonal or conjugate over an interval when the integral of the product of the two functions is zero over that interval. If we form the integral of the product of the two functions $F_A(y)$ and $F_B(y)$ as given by Equations 1 and 2 over the interval $(-b/2, b/2)$, i.e., $$\int_{-b/2}^{b/2} F_A(y)\cdot F_B(y)\cdot dy \quad (3)$$

it is easily seen that this integral is zero if $k=\sqrt{2}$. If this condition is satisfied, therefore, the fields radiated by the array as represented by the two interleaved curves will be decoupled from one another. And, since the peaks of the curves indicate the directions of the main lobes of the directional pattern of the antenna system, it will be seen that (as earlier indicated) the system thus disclosed will make it possible to increase the resolution twofold, for a given radiator width, and hence a given number of radiators, over that which can be achieved with a conventional array in which the energy peaks would be spaced as the peaks of one or the other of the two curves of the field pattern of the improved system.

A further, and equally important, characteristic of the improved field-distribution pattern represented by the regularly overlapping curves of FIGS. 2 and 3 is its close resemblance, geometrically speaking, to the diffraction pattern that would be produced in the focal plane of the focalizing device 1, associated with the array, from a radiant source at infinity. If the said field distribution can be made to coincide with that diffraction pattern, then theory shows that the gain of the system would be maximized. In accordance with a feature of this invention, the array elements are so dimensioned and other parameters are so predetermined, in correlation with the characteristics of the focalizing device 1 used, that this condition is likewise satisfied.

To understand how this is done, it is first necessary to consider the characteristics of the diffraction pattern in greater detail. The elementary diffraction pattern or spot produced through a lens 1 or equivalent focalizing device, by a point source located in a given direction, is of the form shown in FIG. 4 wherein the ordinates E indicate field strength or signal amplitude. The field curve of the diffraction pattern is seen to have a large-amplitude positive central lobe, and an infinite series of alternately negative and positive side lobes of ever-decreasing amplitude. Such a curve has an equation of the general form $$\sin \mu/\mu$$

If all of the side lobes except the first negative lobes be disregarded, which is a permissible approximation in view of the rapidly decreasing amplitudes of the side-lobe series, then the resulting truncated diffraction curve is seen to be closely approximated by one cycle of the displaced or offset sinewave curve shown in FIG. 3. This may be clarified by the following summary analysis.

Equation 1 of curve $F_A(y)$ in FIG. 3 can be rewritten as follows if the coordinate $y$ in Equation 1 is substituted by a coordinate.

$$z=y+\frac{b}{2}$$

that is, if the origin of coordinates is taken at one end of the output aperture of an elementary radiator:

$$F_A(z)=S_E\left(1+k\cos\frac{\pi z}{b}\right) \quad (4)$$

The equation of the diffraction field curve can be written $$G(z)=m\frac{\sin\frac{\pi Dz}{\lambda F}}{\frac{\pi Dz}{\lambda F}} \quad (5)$$

where D is the effective aperture of the focalizing device, such as a mirror or lens, associated with the primary array, λ is the wavelength of the transmitted energy, and F the focal length.

In order to match the curves respectively represented by the Equations 4 and 5 so that the field-distribution curve $F_A(z)$ shall represent a good approximation of the diffraction curve $G(z)$, we must select the parameter $b$ so that the zeroes or nodes of curve $F_A(z)$ on both sides of the origin shall coincide with the zeroes or nodes of the curve $G(z)$. Function $G(z)$ equals zero for $$\frac{\pi Dz}{\lambda F}=\pm\pi,\text{ i.e. } z=\pm\frac{\lambda F}{D}$$

and function $F_A(z)=0$ for $$\cos\frac{\pi z}{b}=-\frac{1}{k}$$

Remembering that $k=\sqrt{2}$ in order to satisfy the orthogonality condition, we get the condition $$b=\frac{4}{3}\frac{\lambda F}{D} \quad (6)$$

Hence, it is seen that by suitably selecting the width $b$ of the elementary radiators in the array, in relation to the focal length and aperture of the focalizing device 1 and the wavelength, it is possible to fit the field distribution curve at the output of the array of FIG. 2 so that it will substantially coincide with the diffraction pattern produced in the focal plane of the focalizing device by a radiant source at infinity. When this is done, the gain of the resulting antenna system is maximized, and external noise is minimized.

To summarize the disclosure up to this point, it has been shown that through the use of a primary antenna array in a multibeam antenna system, wherein the feed of energy to the elementary radiators is so effected, and the dimensioning is so selected in relation to the characteristics of the focalizing device associated with the array, that the field-distribution pattern at the output surface of said array (which surface constitutes the focal surface of the focalizing device) closely simulates the diffraction pattern produced by an infinitely remote radiant source through the focalizing device, the resolution and gain of the multibeam antenna system can both be maximized at the same time, a result which was believed impossible to attain heretofore.

It will be understood that the practical attainment of the results just noted requires certain additional measures to be observed. Thus, while it was stated that the field-distribution curves $F_A$ and $F_B$ of the alternating radiators of the array can be made orthogonal so as to eliminate any mutual coupling or interaction between them, a condition that is of paramount importance for the proper operation of the array of the invention as will easily be understood, this statement is strictly true only if the adjacent sections of each multimode source are decoupled from each other both in the symmetrically excited condition and in the skew-symmetrically excited condition, that is, both when the "A" and "B" feeders are excited in phase and when they are excited in phase opposition. According to a preferred form of the invention, therefore, means are provided for separately decoupling the multimode-source sections both in respect to synmmetrical (or even) modes of skew-symmetrical (or odd) modes. For decoupling with respect to the even modes, suitable energy-absorbing elements in the form of strips, bars, inductive and/or capacitive elements may be positioned in the respective input sections A and B, as will be understood by those familiar with the waveguide art. And for decoupling with respect to the odd modes, one or more strips are positioned in the median plane of the main waveguide section C, preferably at an adjustable distance from the end of the separating wall between the input sections A and B. One such strip is schematically indicated at P in the multimode radiator 23 of the array shown in FIG. 2. The strip acts as a parity-selective obstacle, or partition in that it does not in any way affect the fundamental and higher symmetric (i.e., even) energy modes, while acting to cancel the reflected skew-symmetric (i.e., odd) energy modes, thereby insuring the desired decoupling between the two input sections. Conventional means, which may include the above-noted decoupling elements in the individual input sections, are preferably also provided for matching the input admittances of said sections with the associated feeders.

In addition to the important condition of the invention that the field-distribution curve of each radiator should match the diffraction curve, which condition essentially involves the output-section width $b$ of the multimode-source structure shown in FIG. 5, there are further dimensional conditions to be satisfied in order that the structure shall transmit the requisite modes throughout its various waveguide sections. As earlier indicated, the excitation sections A and B must only transmit the fundamental mode $TE_{10}$, while the main section C must transmit both modes $TE_{10}$ and $EM_{11}$, the higher modes being evanescent. Moreover, the relative phases of both these latter modes must be the same in both the input and the output end planes of main section C.

It can be shown from conventional waveguide theory that the first two conditions as to transmission of the requisite modes are satisfied if the following relation is satisfied:

$$\lambda'c<\lambda<\lambda c \qquad (7)$$

wherein $\lambda'c$ is the cutoff wavelength of the pseudo-mode $EM_{11}$ and $\lambda c$ is the cutoff wavelength of the first higher evanescent mode, $\lambda'c$ and $\lambda c$ depending on the transverse dimensions $a$ and $b$ of the input section of the waveguide. The third condition, as to phasing, involves the dimensioning of the output-section length L. It can be shown that the condition is satisfied if L satisfies the relation $$L=\frac{2\pi}{\beta_{10}-\beta_{11}} \qquad (8)$$

where $\beta_{10}$ and $\beta_{11}$ are the wave-propagation coefficients in the $TE_{10}$ and the "$EM_{11}$" modes respectively, i.e.

$$\beta_{10}=\frac{2\pi}{\lambda}\sqrt{1-\left(\frac{\lambda}{2a}\right)^2} \text{ and } \beta_{11}=\frac{2\pi}{\lambda}\sqrt{1-\left(\frac{\lambda}{2a}\right)^2-\left(\frac{\lambda}{2b}\right)^2} \qquad (9)$$

with $$b=\frac{4\lambda F}{3D}$$

as from Equation 6, and assuming $$a=\frac{3b}{2} \text{ and } \frac{F}{D}=0.75$$

as examples of suitable values, we get $L=6.8\lambda$. It is to be understood that the last-indicated values are illustrative only.

The multimode structure shown in FIG. 5 and described above is of the E-plane type as indicated above. When structures of this type are used as the elementary radiators in a multimode antenna system according to the invention, the system will be capable of performing scanning operations in the electric plane (the plane of wave polarization), and the radiator array can of course be arranged so that this plane is vertical, for scanning in elevation, or horizontal, for azimuthal scanning, as desired. The system of the invention may, alternatively, utilize multimode structures of the H-plane type as the elementary sources in the primary array thereof. Such a structure is shown by way of example in FIG. 9. This structure is seen to differ from the E-plane structure of FIG. 5 essentially in that the excitation waveguide sections A and B are in this case juxtaposed with their broad sides coplanar and their narrow sides adjacent and parallel, instead of being superposed with their broad sides adjacent and parallel and their narrow sides coplanar, as in FIG. 6. The excitation sections A and B have their transverse dimensions so chosen as to propagate only the fundamental mode $TE_{10}$. The main guide section C has its transverse dimensions $a$ and $b$ dimensioned to propagate only the modes $TE_{10}$ and $TE_{20}$, higher modes being evanescent. The length L of the main section is adjusted so that the phase difference between the $TE_{10}$ and $TE_{20}$ modes will be the same both in the input plane of said main section C and in the output plane thereof (the radiant-aperture plane).

The general operation is the same as that of the E-plane-type structure. When both input sections A and B are excited with signals in phase with each other, only the symmetrical (even) fundamental mode $TE_{10}$ can propagate through the output section C, and the field distribution in the output plane is representable by a function of the form $$S(x)=S_H \cos \frac{\pi x}{a} \qquad (10)$$

The form of the field distribution curve is shown in FIG. 10*a*, and the distribution of the electric field-force lines in a transverse plane of the output section is indicated in FIG. 10*b* by arrows.

When the input sections A and B are excited with signals in antiphase relation, there is generated in the output plane of section C, from the $TE_{20}$-mode energy propagating through that section, a skew-symmetric or odd field-distribution law of the form $$D(x)=D_H \sin 2\pi\frac{x}{a} \qquad (11)$$

as indicated by the sinecurve of FIG. 11*a*. The electric field force lines are then distributed as shown in FIG. 11*b*.

When both input sections A and B are excited independently of one another, the resulting field distribution is the sum of the field distributions in the first two cases just considered, as indicated in FIG. 12. The field-distribution functions generated in the output plane of the radiator by the exciting energy fed to the respective A and B inputs are represented by the sum and the difference, respectively, of Equations 10 and 11. If we set $K=S_H/D_H$ representing the ratio of "even"-mode to "odd"-mode amplitudes, the application of the orthogonality or conjugacy condition, analogous to the Equation 3 written earlier, shows that the two resulting field-distribution laws $F_A(x)$ and $F_B(x)$ are orthogonal for $k=1.$, i.e. $S_H=D_H$. The final equations for the field-distribution curves in an array according to the invention using H-plane-type multimode radiators, are therefore:

$$F_A(x)=S_H\left[\cos\frac{\pi x}{a}+\sin\frac{2\pi x}{a}\right] \qquad (12)$$

$$F_B(x)=S_H\left[\cos\frac{\pi x}{a}-\sin\frac{2\pi x}{a}\right] \qquad (13)$$

A radiator array comprising four H-type multimode radiators is partially and schematically shown in FIG. 13, together with the associated two-curve field distribution pattern as given by Equations 12 and 13. The four adjacent H-type radiators are designated 21H through 24H. It will be understood that, in this view as in that of FIG. 3, the common focal surface S on which the radiant apertures of all the radiators are placed has been flattened out into a plane for clarity. The width dimension of each radiator, as measured along the OX coordinate (parallel to the H vector), is designated *a*. On comparing FIG. 13 with FIG. 3, it will be noticed that the crests and valleys of the resultant field-distribution curve in FIG. 13 are twice as frequent as they are in the case of an E-type array as in FIG. 3. As a consequence, narrow crevice-like gaps or discontinuities arise between adjacent $F_A$ and $F_B$ curves opposite each of the separating walls between adjacent H-type radiators. In many practical instances, however, especially where the focal length of the focalizing device associated with the array is comparatively short, this will not seriously affect the operation of the system. In effect, the crevice-like gaps in the field can be considered as bridged, as has been indicated by the dot-dash bridging lines in FIG. 13.

Figure 1:
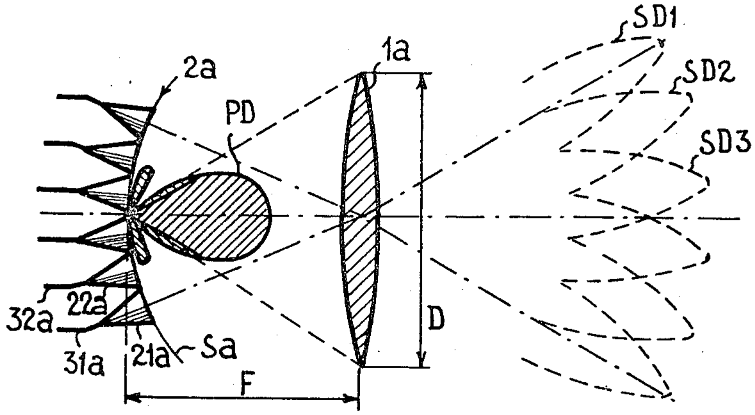
FIG. 1 is a schematic view of a multibeam antenna system of the general type to which the invention relates, including a showing of the primary and secondary radiation diagrams associated therewith.

In further modifications of the invention, the individual radiators of the primary array may be in the form of composite, E- and H-plane multimode structures. While such a modification is not here illustrated in order to avoid needless multiplication of the views of the drawing, its nature will readily be understood from the present disclosure, coupled with a reference to the above-identified Patent No. 3,308,469. In FIG. 1 of that earlier patent there is schematically shown a composite multimode radiator structure which is so constructed that it can generate independent, mutually decoupled field-distribution patterns in two orthogonal directions of its output plane. According to the present invention, a series of such composite multimode radiators may be assembled to provide a primary array for an improved multibeam antenna system, wherein both transverse dimensions ("*b*" and "*a*") of the structure, respectively along the E and the H directions, are separately predetermined in relation to the focal length and aperture of the associated focalizing device, and the amplitude ratios of the exciting energy fed to the "A" and "B" inputs in both directions are separately predetermined according to the teachings disclosed above, so that the output field distributions of the array along the E and H directions will be of the types shown in FIG. 3 and FIG. 13. The gain and resolution of the multibeam antenna system will then be maximized for all directions.

The above description has disclosed in detail the shape and characteristics of the electric field-distribution pattern generated at the output of a primary antenna array constructed according to the invention. This primary field distribution in turn produces a radiation diagram, the primary radiation diagram of the antenna system, which illuminates the focalizing device associated with the array. As is known from antenna theory, the form of this radiation diagram substantially coincides with the Fourier transform of the radiation pattern from which it is created. The primary radiation diagram created from the field-distribution pattern of a single elementary E-type radiator, of the kind shown in FIG. 2 or FIG. 3, is illustrated in FIG. 14. This curve was determined experimentally at a frequency of about 10,000 megacycles, and quite closely corresponds to the theoretical diagram as derived from the Fourier transform of the functions $F_A(y)$ and $F_B(y)$ given by Equations 1 and 2. If this diagram be compared with the E-plane radiation diagram of a conventional horn radiator, obtained under comparable conditions, the main lobe is found to have much steeper sides and the side lobes or ears are substantially lower. It can therefore be expected that the over-all or secondary radiation diagram produced by the system will show higher gain, as well as reduced spill-over and lower noise level, in addition to the increase in resolution that is inherently provided by the improved array as earlier explained.

In FIG. 14, the abscissae are dimensionless numbers proportional to the width *b* of the type-E multimode radiator, and the ordinates, in decibels, represent radiated power $Pr$ in the vertical plane in a direction inclined at the angle $\alpha$ to the axis.

The secondary radiation diagram of an elementary radiator can in turn be derived by straightforward mathematical analysis. Although for brevity the analysis is not here given, it is indicated that the general procedure involves considering the system consisting of the multimode radiator plus the focalizing device as a matched filter combination, in accordance with the principles of application of signal theory to antenna systems, referred to elsewhere herein. The components of the system are treated as though they were matched bandpass filters, so that from a knowledge of the illumination law (or field-distribution pattern) of the multimode primary radiator, and of the diffraction pattern through the focalizing device, the strength of the radiated field in a given direction can be calculated. The ordinates of the desired radiation diagram, which represent the gain of the system in the given direction, can then be determined as proportional to the square of the field strength. The secondary diagram associated with an elementary radiator or source is given in FIG. 15, where the abscissae $\psi$ represent elevation angles in degrees, and the ordinates in decibels represent the gain $Ge$. Here again the experimental curve, obtained at about 10,000 megacycles with a circular focalizing lens device of about 50 cm. diameter aperture (D), and focal length $F=50$ centimeters, closely approaches the theoretical curve computed as explained above. In FIG. 15, the vertical dashed line indicates the approximate position of the intersection of the radiation diagram with that of a next-adjacent source. The level of intersection is substantially increased in an array according to the invention, which is advantageous in that the minimum gain is correspondingly increased.

FIG. 16 similarly illustrates the secondary or over-all radiation pattern of a three-beam antenna system according to the invention, including an array of four E-type multimode-source structures and the focalizing device just described above. The same coordinates as in FIG. 15 are used. The low-level side lobes have not been included in this showing for the sake of clarity of the drawing. Their effect has been found insignificant for the usual apertures and is only noticeable for small aperture values.

From the description of the E-type multimode-source structure, given above with reference to FIG. 5, it will be recalled that the width dimension *b* is bound to the ratio $F/D$, of focal length to aperture of the focalizing device, by a proportionality relation. Furthermore, the transverse dimensions *a* and *b* must satisfy the necessary relations to ensure that only the desired $TE_{10}$ and $TM_{11}$ can propagate down the output section of the multimode structure, as also indicated earlier in this description. Because this latter dimensional condition is rather stringent, it follows that the $F/D$ ratio of the antenna system will itself be determined between rather narrow limits, and this limitation may prove troublesome in many practical instances. However, this limitation can be completely eliminated through the use of flared multimode-source structures as the elementary radiator structures of the primary array, according to the preferred embodiment of the invention now to be described.

A flared E-type multimode structure is schematically shown in FIG. 17. It will be seen that this structure differs from that of FIG. 5 essentially only in that its main or output section includes, in addition to a first subsection C1 of uniform transverse dimensions, a terminal subsection C2 of flared form. In such a structure, the dimensions *a*1 and *b*1 of the initial subsection C1 are selected as earlier described so as to ensure propagation of only the desired $TE_{10}$ and $TM_{11}$ modes through the structure. The transverse dimensions *a*2 and *b*2 at the radiating aperture end of subsection C2 are in turn selected so as to satisfy the prescribed proportionality relation with respect to the $F/D$ ratio for generating an output field distribution simulating the diffraction pattern through the associated focalizing device and thereby maximizing the gain through the system, according to the rules earlier given herein. Finally, the lengths $L_1$ and $L_2$ of the subsections C1 and C2 are predetermined with respect to each other so as to satisfy the condition, referred to earlier, that the relative phasing of the $TE_{10}$ and $TM_{11}$ modes is the same, at both the input and the output ends of the flared subsection. A straightforward calculation yields an analytical relation between the lengths $L_1$ and $L_2$ which satisfies this condition. This relation can be satisfied when $L_1$ is reduced to zero, and the resulting structure, in which the uniform-section portion C1 is omitted, is in fact found particularly convenient in practice, for both structural and electrical reasons. In this instance, the condition required for the length $L_2$ or L of the flared section is given below:

$$L_2=L=\frac{2(a2-a1)}{(\cot t_2-\cot t_1)+(t_2-t_1)-K(\cot \mu_2-\cot \mu_1)-K(\mu_2-\mu_1)}$$

where $$\sin t_1=\frac{\lambda}{2a_1},\ \sin t_2=\frac{\lambda}{2a_2},\ \sin \mu_1=K\frac{\lambda}{2a_1},\ \sin \mu_2=K\frac{\lambda}{2a_2}$$

and $$K=\frac{\sqrt{a_1^2-b_1^2}}{b_1}$$

With such a structure, therefore, it is seen to be possible owing to the additional degree of freedom introduced by the varying cross section, to match the radiator structure to any pre-specified value of the $F/D$ ratio of the focalizing device associated with the radiator array, thereby overcoming the previously noted limitation.

A practical construction of a flared E-type multimode radiator of the kind just described is shown in FIG. 18. The radiator comprises the uniformly flared output section C, which at its output end is beveled as shown at 210. The bevels serve to assemble the output section shown with the output section of a similar adjacent radiator (not shown in the drawing), without any discontinuity therebetween. At its input end, the flared output section C is connected by way of a supporting and connecting structure 212 with the twin excitation sections A and B, which are bent away from each other at angles of 150° relative to the boresight of the radiator, as shown at 214. The input end of each of the input sections A and B contains a conventional quarter-wave, E-plane matching transformer 220 which serves to reduce the height of the input guide section to the height dimension of a standard waveguide section, which in the present instance (10,000 megacycles frequency) is 3 centimeters. The A and B input guides of adjacent radiator structures are connected by way of the flanges 216 to the respective legs of a symmetrical Y-divider or hybrid junction 4. The common leg of the Y-divider 4 is mounted in a support 218 and contains a quarter-wave H-plane matching transformer 221 which serves to match the Y-divider guide with a feeder guide (not shown) of standard height (3 cm.) connected thereto in support 218. The reduction in waveguide height was necessary in order to ensure cutoff of the $TE_{11}$ mode energy in the common leg of the Y-divider.

The angle formed between the legs of the Y-divider in each radiator structure of a system as shown in FIG. 18 was geometrically determined so that the output apertures of all the radiators would lie on a common spherical surface, the focal sphere of the focalizing device presently to be described.

The principal dimensions of the radiator structure were the following:

Transverse dimensions of the flared section C at its narrow or input end:

$$a_1=3.125 \text{ cm.}, \quad b_1=2.08 \text{ cm.}$$

Transverse dimensions of flared section at its broad or output end:

$$a_2=7.4 \text{ cm.}, \quad b_2=4.94 \text{ cm.}$$

Length of flared section: $L=21.7$ cm.

The focalizing device 1 (a lens) with which the radiator array was associated was specified to have an aperture $D=50$ cm. and a focal length $F=50$ cm., so that the ratio $F/D=1$. With this value of the $F/D$ ratio and the set of radiator dimensions just indicated above, the desired coincidence between the field-distribution pattern of the radiator and the diffraction pattern through the focalizing device occurred in both the E and H planes for a transmitted frequency of 9,600 megacycles.

At each end of the array of four radiators, the free ends of the Y dividers were connected to matching load terminations. These serve merely to match the end radiators of the array, and the power dissipation in the matching loads is negligibly small, such dissipation being in theory zero if the coincidence between the field distribution and diffraction patterns were perfect.

The focalizing device used in this embodiment was a circular lens made of polystyrene and surrounded by an absorbing diaphragm of the useful diameter $D=50$ cm.

FIG. 19 compares the gain of the primary array according to the embodiment just described, with the gain of a comparable array consisting of conventional horn radiators, for different values of the displacement between adjacent beams. The coordinates used are dimensionless numbers proportional to the variable just specified. Curve (1) relates to the source according to the invention, and curve (2) to the conventional source. The vertical line indicates the limit of resolution for the horn radiators, about 0.94 with the units used for the abscissae. It will be seen that, at this value of inter-beam displacement, the array of the invention yields a considerably higher gain, and that the gain thereof remains consistently higher than that of the conventional array, for equal resolution, throughout the operating range. It should also be noted that the gain curves of FIG. 19 were plotted for one-way operation (transmission or reception). In the case of two-way operating conditions normal in radar work, the gain values must be squared, so that the improvement afforded by the invention is even more remarkable than stands out from the graph.

When the array of the invention and the conventional array are adjusted so that each will give maximal gain in the direction of intersection of adjacent beams, and the performance of the systems thus adjusted is compared, it is found that the maximal gain of the improved system exceeds that of the conventional one by 1.2 db (in one-way operation), while at the same time the absolute level of the radiated power in the direction of intersection is also higher (as earlier mentioned). Further, the improved array imparts increased resolving power to the system and affords separation between a maximum number of targets, as earlier explained, while employing a smaller number of radiators.

The means for feeding energy to and from a primary antenna array according to the invention, by way of the hybrid junctions 40–44 (FIG. 2) or equivalent feeder means, may assume any of various forms which may be generally conventional except in that they must satisfy the rules specified above with respect to the amplitudes and phases of the signals applied to the adjacent radiator sections, in order to produce the field-distribution patterns used according to the invention. However, according to a preferred aspect of the invention, so-called interpolating means are provided in the paths of the received signals derived from the radiators of the array whereby the separating power of the antenna system is further enhanced. The principle of operation of this embodiment of the invention will first be described with reference to FIG. 20.

The curve 50 represents a fictional "target surface" at a remote location from the antenna system, over which a plurality of point targets are shown spread out, e.g., aircraft to be monitored by a multibeam radar with which the antenna system of the invention is associated. Some of the point targets, specifically those shown as $M_1$, $M_2$, are located at such positions that their images through the focalizer lens 1 coincide with the peaks of the field-distribution curves of the radiators, the corresponding image points being shown at $m_1$, $m_2$. In general, however, a target point will be situated somewhere in between two such privileged locations, as is shown by way of example for the target point M. Such an intermediate target will produce an image through the focalizing lens 1 which lines intermediate the peaks $m_1$ and $m_2$ of adjacent field-distribution loops. As will be understood from earlier explanations, such an intermediate image can be considered as resulting from two component field values, respectively indicated by the ordinates $M_A$ and $M_B$ of the two adjacent, intersecting field-distribution loops $F_A(y)$ and $F_B(y)$. Therefore, a knowledge of the length of segment $\overline{m_A m_B}$, i.e., the difference of the signal field strengthens associated with the two sections A and B of a radiator irradiated by the target M, will precisely indicate the angle of off-beam displacement of that target. The interpolator circuitry now to be described derives such indication.

FIG. 21 schematically shows one such interpolator circuit associated with the feeder junction 41 of the pair of radiators 21 and 22 of the array. Feeder junction 41 may be a conventional hybrid junction or magic-T device, as earlier indicated, and for the purposes of the present embodiment all four legs or terminals of the device are utilized. Two of the legs designated 411 and 412 are connected to the $B_1$ and $A_2$ sections of the adjacent radiators for transferring energy to and from them as already described. A third leg 413 of the device carries a signal representing the sum of the signals present in the legs 411 and 412, and the fourth leg 414 carries a signal representing the difference of the signals in legs 411 and 412.

The sum-signal leg 413 is connected to one terminal 52 of a circular unit 5 having two further terminals 51 and 53. Terminal 51 is an input terminal connected to a conventional radar transmitter unit 54, and terminal 53 is a receiving or ouput terminal.

Unit 5 may be any conventional circulator device, e.g., one using ferromagnetic material (ferrite or garnet) for directionally coupling the energy applied to its terminals. The circulator operates so that signal energy applied from radar transmitter 54 to circulator input terminal 51 will issue from terminal 52 with hardly any attenuation, and received radar-signal energy applied to circulator terminal 52 will issue from circulator output terminal 53 with hardly any attenuation; on the other hand, energy applied to input terminal 51 will substantially not appear at terminal 53, owing to the high attenuation of reverse flow around the circulator, in the well-known manner.

Circulator 5 therefore acts as a directional coupler so that during transmission radar-signal energy from transmitter 54 can be applied through hybrid-junction feeder 41 to the radiator sections B1 and A2 as earlier described, whereas during reception the received signal energy from said radiator sections B1 and A2 will combine to produce a sum signal (designated $\Sigma$) delivered from circulator output terminal 53. This sum signal is applied to one input of a conventional mixer circuit 8.

The difference-signal leg 414 of hybrid junction 41 is connected by way of a conventional isolator circuit 6 to one input of a mixer 9, isolator 6 preventing the reverse flow of reflected signal energy from mixer 9 to junction 41.

Mixers 8 and 9 have their second inputs supplied with the output of a common local oscillator 10. The heterodyned sum and difference signals delivered by mixers 8 and 9 are passed through intermediate-frequency amplifiers 11 and 12 respectively, and the amplified signals are applied to respective inputs of a demodulator 13, preferably of the coherent, symmetrical, carrier-suppressing type such as a so-called product demodulator, well-known in the art.

The output from sum-signal amplifier 11 is also applied through a detector diode 14 to one input of a comparator circuit 15, whose other input receives a constant adjustable signal from a suitable reference source. The output of comparator 15 is applied to the gain-controlling inputs of both I.-F. amplifiers 11 and 12.

In the operation of this interpolator circuit, it will be seen that during reception of radar signals by radiators 21 and 22 from a target such as M (FIG. 20) a signal, representing the sum of the signals collected from the common target by sections $B_1$ and $A_{12}$ of the two radiators involved, is heterodyned in mixer 8 and amplified in amplifier 11. As will be evident from a consideration of the curves $F_A$ and $F_B$ in FIG. 20 (or FIG. 3) the said sum of signals remains at all times equal to a constant value, which corresponds to twice the field strength at the point of intersection $\mu$ between the two curves, regardless of the off-axis displacement of the target, provided the reception power remains constant. Simultaneously, a signal $\Delta$ representing the difference of said collected signals is heterodyned in mixer 9 and amplified in amplifier 12. As already indicated, the difference signal $\Delta$ repersents the segment $m_Am_B$ in FIG. 20 and hence is a measure of the off-axis displacement of the target, provided the reception power remains constant. The automatic gain control circuit comprising detector diode 14 and comparator 15 serves to normalize the amplified sum and difference signals in amplitude, so as to render their amplitudes independent of reception power. Thus, when the normalized sum and difference signals are demodulated with one another in the coherent symmetrical demodulator 13, the output of the demodulator will represent the angular off-axis displacement of the target M with respect to the axis of one of the radiators, herein the axis of radiator 22 as defined by the point $\mu$, thereby providing a precise indication of target position.

It will therefore be apparent that the system of the invention in this embodiment, while using a limited number of discontinuous energy beams, will enable a continuous analysis of space to be performed, in the sense that the position of a target can be precisely determined regardless of its location relative to the axis of any of the beams.

What we claim is:

1. A multibeam antenna system comprising:
a primary source of electromagnetic wave energy;
focalizing means disposed in mutually irradiating relationship with said primary source;
said primary source including
an array of multimode radiators each having a main waveguide section and a pair of excitation waveguide sections extending from said main waveguide section;
said main waveguide sections terminating in respective radiant apertures adjacently disposed on a radiant surface coinciding with a focal surface of said focalizing means;
energizing means connected in energy-transfer relation with said excitation waveguide sections;
and coupling means connected between said excitation waveguide sections and said energizing means for transmitting wave energy in random phase relationship to the two excitation waveguide sections of any one of said radiators and in equiphase relationship to adjoining excitation waveguide sections of any two adjacent radiators of said array, thereby generating an overall energy-distribution pattern at said radiant surface in the form of two separate, substantially continuous undulating curves symmetrically overlapping each other in conjugate relationship.

2. The system defined in claim 1, wherein each of said excitation waveguide sections has transverse dimensions predetermined to sustain the propagation of substantially only the fundamental energy mode $TE_{10}$, and said main waveguide section has transverse dimensions predetermined to sustain the propagation of substantially only said fundamental energy mode $TE_{10}$ and selected higher modes.

3. The system defined in claim 2, wherein said multimode structures are E-plane-type radiator structures and said selected higher modes comprise the $TE_{11}$ and $TM_{11}$ modes.

4. The system defined in claim 3, wherein said multimode radiator structures have their radiant apertures disposed with their broad sides parallel to the magnetic field vector and in adjacent relation to one another, and said excitation sections are arranged with their broad sides juxtaposed along a direction parallel to the electric field vector.

5. The system defined in claim 2, wherein said multimode structures are H-plane-type radiator structures and said selected higher modes comprise the $TE_{10}$ and $TE_{20}$ modes.

6. The system defined in claim 5, wherein said multimode radiator structures have their radiant apertures disposed with their narrow sides parallel to the electric field vector in adjacent relation to one another, and said excitation sections are arranged with their narrow sides juxtaposed along a direction parallel to the electric field vector.

7. The system defined in claim 2, wherein said multimode radiator structures are composite E-plane-type and H-plane-type structures.

8. The system defined in claim 2, wherein said main waveguide section has a length predetermined to impart equal phase conditions to said selected higher modes at both ends of said main section.

9. The system defined in claim 2, wherein said excitation sections are disposed on opposite sides of a common separating wall, and their combined extent is not substantially less than that of the adjacent end of the main waveguide section.

10. The system defined in claim 9, further including partitioning strip means disposed in said main waveguide section in the plane of said common separating wall and in spaced relationship therewith for decoupling said selected higher modes from each other.

11. The system defined in claim 1, wherein said main waveguide section is flared over at least a part of its length up to the radiant aperture thereof.

12. The system defined in claim 1, wherein said energizing means comprise hybrid junctions having respective legs connected to adjacent excitation sections of respective adjacent radiators and having at least one other leg connectable to a common signal source.

13. The system defined in claim 12, wherein the hybrid junctions associated with the radiators at opposite ends of the array have free legs unconnected to any of said waveguide sections, further comprising matched loads connected to said free legs.

14. The system defined in claim 12, wherein said hybrid junctions comprise magic-T devices.

15. The system defined in claim 1, wherein each of said excitation waveguide sections has transverse dimensions so correlated with the focal length and the effective aperture of said focalizing means as to assimilate the undulations of each of said curves to the diffraction pattern produced by a point source of radiant energy through said focalizing means on said focal surface.

16. A multibeam antenna system comprising:

an array of multimode radiators each having a common waveguide section and a pair of branch waveguide sections merging with said common waveguide sections;

focalizing means for radiant energy having a focal surface proximal to said radiators, the common waveguide section of each of said radiators terminating in a mouth aperture substantially coinciding with a respective sector of said focal surface;

circuit means for the transmission of wave energy traversing the waveguide sections of said radiators; and coupling means connected between said branch waveguide sections and said circuit means for transferring wave energy between said circuit means and the branch waveguide sections of any one of said radiators in random phase relationship while maintaining equiphase relationship with respect to wave energy transferred between said circuit means and adjoining branch waveguide sections of any two adjacent radiators of said array, thereby generating an overall energy-distributing pattern along said focal surface in the form of two separate, substantially continuous undulating curves symmetrically overlapping each other in conjugate relationship.

17. The system defined in claim 16, wherein each of said branch waveguide sections has transverse dimensions so correlated with the focal length and the effective aperture of said focalizing means as to assimilate the undulations of each of said curves to the diffraction pattern produced by a point source of radiant energy through said focalizing means on said focal surface.

18. The system defined in claim 17, wherein said transverse dimensions are so chosen that the zeroes of said undulating curves substantially coincide with nodes of said diffraction pattern at the operating wavelength.

19. The system defined in claim 16, wherein said circuit means includes first means for developing a sum signal corresponding to the sum of signal energies from a common point target as defined by a beam intersecting undulating curves, second means for developing a difference signal corresponding to the difference of signal energies from said common target as defined by the intersections of said beams with curves, and third means for combining said sum and difference signals to provide an indication of the displacement of said target from a reference direction defined by said curves.

References Cited

UNITED STATES PATENTS

| | | | |
|---|---|---|---|
| 3,089,136 | 5/1963 | Albersheim | 343—16 |
| 3,308,468 | 3/1967 | Hannan | 343—777 |

RODNEY D. BENNETT, *Primary Examiner.*

T. H. TUBBESING, *Assistant Examiner.*